United States Patent
Yohanandan et al.

(10) Patent No.: US 11,475,572 B2
(45) Date of Patent: Oct. 18, 2022

(54) SYSTEMS AND METHODS FOR OBJECT DETECTION AND RECOGNITION

(71) Applicant: Xailient, Sydney (AU)

(72) Inventors: Shivanthan Yohanandan, Pakenham (AU); Lars Oleson, Bondi (AU)

(73) Assignee: Xailient, Sydney (AU)

(*) Notice: Subject to any disclaimer, the term of this patent is extended or adjusted under 35 U.S.C. 154(b) by 97 days.

(21) Appl. No.: 16/953,585

(22) Filed: Nov. 20, 2020

(65) Prior Publication Data
US 2021/0150721 A1 May 20, 2021

Related U.S. Application Data
(60) Provisional application No. 62/938,050, filed on Nov. 20, 2019.

(51) Int. Cl.
| | |
|---|---|
| *G06T 7/11* | (2017.01) |
| *G06N 3/04* | (2006.01) |
| *G06V 10/20* | (2022.01) |
| *G06V 20/56* | (2022.01) |

(52) U.S. Cl.
CPC .............. *G06T 7/11* (2017.01); *G06N 3/0454* (2013.01); *G06V 10/255* (2022.01); *G06V 20/56* (2022.01); *G06T 2207/20081* (2013.01); *G06T 2207/20084* (2013.01); *G06T 2207/30156* (2013.01)

(58) Field of Classification Search
CPC .... G06K 9/6272; G06N 3/0454; G06N 3/084; G06T 2207/20081; G06T 2207/20084; G06T 2207/30156; G06T 7/11; G06V 10/255; G06V 10/50; G06V 10/82; G06V 20/56
See application file for complete search history.

(56) References Cited

U.S. PATENT DOCUMENTS

| | | | | |
|---|---|---|---|---|
| 11,062,464 | B2* | 7/2021 | Kobayashi | G06T 5/50 |
| 2004/0016870 | A1* | 1/2004 | Pawlicki | G06V 20/582 |
| | | | | 315/77 |
| 2014/0185925 | A1* | 7/2014 | Datta | G06K 9/6262 |
| | | | | 382/159 |
| 2020/0007847 | A1* | 1/2020 | Redden | H04N 13/128 |
| 2021/0142463 | A1* | 5/2021 | Amirghodsi | G06T 7/337 |
| 2021/0150721 | A1* | 5/2021 | Yohanandan | G06V 10/82 |
| 2021/0166400 | A1* | 6/2021 | Goel | G06N 3/08 |
| 2021/0233213 | A1* | 7/2021 | Mejjati | G06V 10/82 |
| 2022/0076413 | A1* | 3/2022 | Sheldrick | A61B 5/4566 |
| 2022/0111868 | A1* | 4/2022 | Costea | G06V 10/764 |

\* cited by examiner

*Primary Examiner* — Bobbak Safaipour
(74) *Attorney, Agent, or Firm* — Goodwin Procter LLP

(57) ABSTRACT

Techniques for identifying pixel groups representing objects in an image include using images having multiple groups of pixels, grouped such that each pixel group represents a zone of interest and determining a pixel value for pixels within each pixel group based on a comparison of pixel values for each individual pixel within the group. A probability heat map is derived from the pixel group values using a first neural network using the pixel group values as input and produces the heat map having a set of graded values indicative of the probability that the respective pixel group includes an object of interest. A zone of interest is identified based on whether the groups of graded values meet a determined probability threshold objects of interest are identified within the at least one zone of interest by way of a second neural network.

33 Claims, 7 Drawing Sheets

Object Detection Method 100

SYSTEMS AND METHODS FOR OBJECT DETECTION AND RECOGNITION

CROSS-REFERENCE TO RELATED APPLICATIONS

This application claims priority to and the benefit of U.S. Provisional Patent Application Ser. No. 62/938,050, filed on Nov. 20, 2019, the entire disclosure of which is incorporated herein by reference.

TECHNICAL FIELD

The following disclosure is directed to methods and systems for selective image recognition and, more specifically, selectively identifying zones of interest and objects of interest located therein.

BACKGROUND

With the rise of intelligent systems, the amount of data being retrieved, transmitted, and further processed is continuously growing. The need to quickly and accurately ingest, process and make decisions based on image data has become critical to industries such as user authentication, autonomous vehicle command and control, and physical security. However, achieving a good balance between accuracy (e.g., avoiding false-positives and false-negatives) and speed of processing is difficult, and often requires different decisions depending on the domain.

Current artificial intelligent object detection mechanisms use machine learning and large training datasets to train neural networks in an attempt to accelerate the decision process. These neural networks may then be used to process input data within a similar domain as the large training dataset. Although the input data processed by the neural network can produce results as accurate as the training dataset, the results from the input data are only accurate if the training dataset accurately reflect the input data. Applying such complex neural network logic to wider varieties and larger datasets of input data can prove difficult. As such, methods and systems for data processing using neural networks would benefit greatly from improved execution efficiency.

SUMMARY OF THE INVENTION

To achieve the desired accuracy and speed while adhering to the power usage constraints of various edge devices, aspects of the invention use a two-step process wherein pixels are grouped and analyzed using a first neural network and associated training datasets, and then, once certain groups are identified as being of potential interest, those groups are further examined using a second neural network process (which may be trained using a different set of images) to identify a particular object.

Therefore, in a first aspect, embodiments of the invention provide a method for determining at least a zone of interest within an image. The method includes receiving, by a computer processor, image data that includes multiple pixel groups, wherein each pixel group comprises an average distance therebetween such that the number of pixels within a smallest zone of interest falls between a minimum sample and a maximum sample within the potential zone of interest. A pixel value is then determined for pixels of the plurality of pixel groups, wherein the pixel value is determined from a comparison of plurality of pixel values for each pixel. A pixel group value is then derived for each of the pixel groups, wherein the pixel group value is based on the pixel values of the pixels associated with the respective pixel group.

A heat map is then created from the plurality of maximum pixel group values by way of a first neural network, wherein the first neural network receives as input at least one pixel group value and produces as output the probability heat map comprising groups of graded values, which are indicative of the probability that the respective pixel group includes a representation of an object of interest. A zone of interest is identified based on whether the groups of graded values meet a determined probability threshold, objects of interest are then identified within at least one zone of interest by way of a second neural network (which in some instances may be the same network as the first network), wherein the second neural network receives as input at least one zone of interest and produces as output a representation of the objects of interest, and wherein the representation of the objects of interest comprises at least a classification of each object of interest and the location of the object within the received image data.

In some embodiments, the pixel group value comprises a pixel value summarizing the various pixel values of the pixels associated with the respective pixel group. The pixel values may, for example, be associated with a summary value of each pixel such as a summary of the image data channels, such as RGB, YUV or other. The summary transformation may for example, be the average, maximum, harmonic mean, intensity or other mathematical summary of the values associated with each pixel group, and mathematical transformations may or may not be used to calculate the pixel values for each pixel of a pixel group. The pixel groups may be of any size, but in some instances the groups are at least four pixels wide and four pixels in height. In some cases, the width and/or height dimension may be capped at eighteen pixels. In some implementations, the determined probability threshold is predetermined, whereas in other instances it is dynamically determined at runtime.

One or both of the neural networks may be fully convolutional networks (FCNs), and in some cases where the first neural network is a fully convolutional multi-layer network (FCN) it comprises a minimum of three layers and a maximum of seven layers. In some cases, none of the multiple layers of the first neural network are fully connected.

In another aspect, embodiments of the invention provide a system for determining a zone of interest within an image that includes a non-transitory computer-readable medium for storing received image data and a processor configured to executed stored instructions which when executed includes receiving, by a computer processor, image data that includes multiple pixel groups, wherein each pixel group comprises an average distance therebetween such that the number of pixels within a smallest zone of interest falls between a minimum sample and a maximum sample within the potential zone of interest. A pixel value is then determined for pixels of the plurality of pixel groups, wherein the pixel value is determined from a comparison of plurality of pixel values for each pixel. A pixel group value is then derived for each of the pixel groups, wherein the pixel group value is based on the pixel values of the pixels associated with the respective pixel group.

A heat map is then created from the plurality of maximum pixel group values by way of a first neural network, wherein the first neural network receives as input at least one pixel group value and produces as output the probability heat map comprising groups of graded values, which are indicative of the probability that the respective pixel group includes a representation of an object of interest. A zone of interest is identified based on whether the groups of graded values meet a determined probability threshold, objects of interest are then identified within at least one zone of interest by way of a second neural network (which in some instances may be the same network as the first network), wherein the second neural network receives as input at least one zone of interest and produces as output a representation of the objects of interest, and wherein the representation of the objects of interest comprises at least a classification of each object of interest and the location of the object within the received image data.

In some embodiments, the pixel group value comprises a pixel value summarizing the various pixel values associated with the respective pixel group. The pixel values may, for example, be associated with a summary value of each pixel, such as a summary of the image data channels, such as RGB, YUV or other. The summary may for example, be the average, maximum, harmonic mean, or other mathematical summary of the intensity values associated with each pixel group, and mathematical transformations may or may not be used to calculate the pixel values for each pixel of a pixel group. The pixel groups may be of any size, but in some instances the groups are at least four pixels wide and four pixels in height. In some cases, the width and/or height dimension may be capped at eighteen pixels. In some implementations, the determined probability threshold is predetermined, whereas in other instances it is dynamically determined at runtime.

One or both of the neural networks may be fully convolutional networks (FCNs), and in some cases where the first neural network is a fully convolutional multi-layer network (FCN) it comprises a minimum of three layers and a maximum of seven layers. In some cases, none of the multiple layers of the first neural network are fully connected.

In other aspects of the invention, the processes, methods and instructions described above and herein are stored and executed on a non-transitory computer-readable medium.

DETAILED DESCRIPTION

Figure 1:
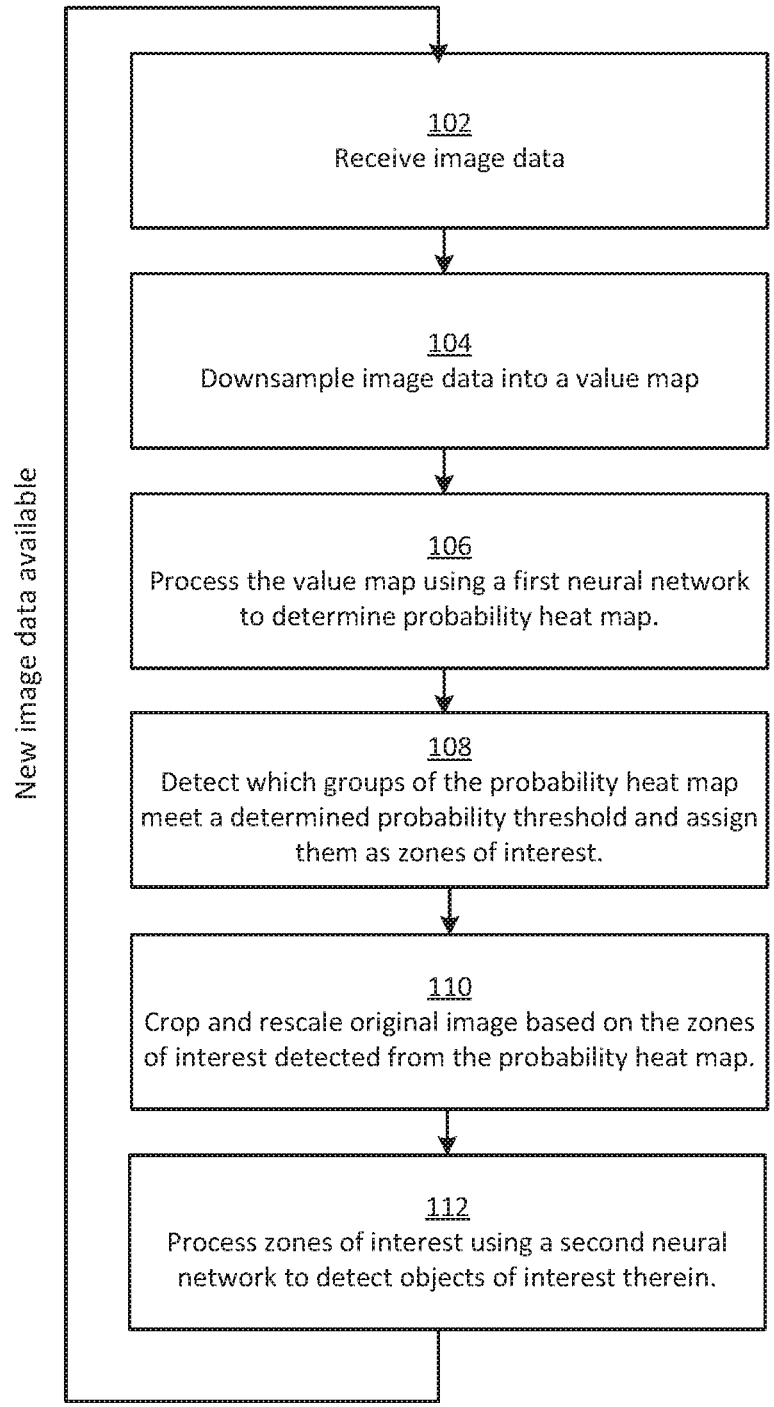
FIG. 1 depicts a workflow diagram of an exemplary method for detecting zones of interest and objects located therein, according to an exemplary embodiment.

Disclosed herein are exemplary embodiments of methods and supporting systems that facilitate active zone and object identification within images using neural networks. Neural networks can be used to detect zones of interest, objects of interest, classifications of the objects of interest, locations of the objects of interest within the zones of interest, and locations of the zones of interest within the input data. The system and methods facilitate the creation of one or more training datasets used across one or more domains, and actively employs neural networks working in tandem to process input data and identify a zone or object of interest using the training datasets.

One or more of the numerous neural networks may be used in various stages along the data flow. For example, a neural network may be used as a pre-processing mechanism for other neural networks. A neural network may also be used as a codec (e.g., an encoder and decoder) to assist with the transmission of data. Furthermore, a neural network may also be used as both a pre-processor and a codec that does both localization and classification of zones or objects of interest.

Training Data

In one embodiment, one or more training dataset(s) are created. In certain implementations, different individual datasets may be created and maintained that are specific to a particular domain—e.g., a training dataset may be developed and used to process images for reading license plates, another dataset for facial detection and recognition, and yet another for object detection used in an autonomous driving context. By using domain-specific training datasets as the basis for subsequent network processing, the processing and power efficiencies of the system are optimized, allowing processing to occur on "edge" devices (internet of things devices, mobile phones, automobiles, security cameras, etc.) without compromising accuracy.

To create a training dataset, a first set of images is identified for a particular domain (e.g., frames from a multitude of surveillance cameras at an airport). A specific property, such as "does this image include a face" is selected as a property of interest. In some cases, the same set of images may be used to create multiple training datasets, using a different property of interest. A user then labels the pixels (or sets of pixels) as either "interesting" or "uninteresting" creating an array describing the image with respect to the property of interest. In some cases, the labeling may be done using automated processes such as supervised or semi-supervised artificial intelligence. This may, for example, take the form of an array label of 1's and 0's, with 1's representing pixels of interest (e.g., these pixels represent a face) and 0's representing pixels that are not of interest (e.g., background, etc.).

In some cases, the pixels may be grouped and represented as a plurality of different channels within the image, effectively decomposing the image into a set of composite images such that each channel can be individually processed. This approach may be beneficial when an image includes multiple different areas of interest (e.g., more than one image of a person, or an image with different objects along a street scene), and the different channels are processed using different networks. In other cases, the image may be processed as a single channel.

In various examples, training of the object detection and classification system can be achieved using either single or multi-step processes. In some examples, the system is trained using stochastic gradient descent and back-propagation. For example, a set of initial starting parameters are identified, which are further refined using the training images and output a convolutional feature map with trained proposals in an iterative process.

In various examples, the object detection and classification system is trained using a single-step process using back-propagation. In such examples, the machine learning module may initialize the initial processing module, the object proposal module and the object classifier module with starting parameters. After initialization, the machine learning module can process a training image through the initial processing module, the object proposal module, and the object classifier module. Using back-propagation, the machine learning module can score the output proposals, classifications, and confidence scores based on data corresponding to the training image. The machine learning module can train the parameters in the initial processing module, the object proposal module, and the object classifier module, in order to improve the accuracy of the output object classifications and confidence scores. In various examples, the machine learning process can train the system in an initial set-up. In other examples, the machine learning process can train the system periodically, such as, for example, at a specified time each week or month, or when the amount of new data (e.g., new images) reaches a threshold. For example, new images may be retrieved from edge devices over time (either continuously while connected to a centralized cloud-based system or asynchronously when such connections and/or the requisite bandwidth are available). In some examples, the machine learning process receives updated images for subsequent training when manually collected by a user. In some instances, collection rules may be defined by a user or be provided with the system itself, or in yet other cases, automatically generated based on user-defined goals. For example, a user may determine that a particular object type is more interesting than others, and as such when the system recognizes such objects those images are collected and used for further training iterations, whereas other images may be ignored or collected less frequently.

In either instance, the subsequent processing of an image occurs on a channel by channel basis (a single channel at a time). As such, images that have been modeled as multiple channels are converted to a single channel. In one embodiment, a random number between a minimum and maximum pixel value within the pixel group is selected and used as the basis for the conversion.

FIG. 1 illustrates a workflow diagram for an exemplary method 100 of detecting zones of interest and objects of interest located therein using multiple neural networks trained using the training datasets described above. Method 100 includes receiving image data at 102. The image data received therein may be in a wide-variety of formats. Image data formats may include, but are not limited to, raster formats (e.g., JPEG, Exif, TIFF, GIF, BMP, etc.), vector formats (e.g., CGM, SVG, DXF, etc.), combinations thereof, or any other image data format. The format in which image data is received may depend on the device or apparatus that generates and transmits such data. According to some embodiments, a camera may generate image data in a JPEG format with individual pixel values for each pixel. The pixel values may be in the colorspace, such as red, green, and blue or luma and chrominance, (e.g., YUV) values, and in some cases may include a depth ("D") value. According to other embodiments, a camera may generate image data in an SVG format with individual XML elements, such as vector graphic shapes, bitmap images, and text.

Method 100 includes downsampling the image data into a value map at 104. Downsampling image data may include grouping two or more pixels into a pixel group. The downsampling step may include determining an optimal group size, shape or both. For example, a 4×6 area of 24 pixels may be combined and analyzed as a single pixel group. The pixel group may be assigned a pixel group value based on the pixel values of each of the two or more pixels associated with the group of pixels. According to one embodiment, the two or more pixels may each include pixel values such as red, green, and blue. According to various embodiments, other pixel values may include YUV (e.g., luma values, blue projection values, red projection values), CMYK (e.g., cayan values, magenta values, yellow values, black values), multi-color channels, hyperspectral channels, or any other data associated with digitally recording electromagnetic radiation or assembling a digital image. In some cases, each pixel group's value is determined by determining the pixel value of the pixel values associated with the pixel group. In other instances, the pixel group value may be determined based on an average pixel value, or some other threshold value (e.g., a percentage of the maximum pixel value). The value may be determined as a summary of the image data channels, such as RGB, YUV or other channel. The summary transformation may for example, be the average, maximum, harmonic mean, or other mathematical summary of the values associated with each pixel group. A value map is then generated based on a combination of one or more pixel group values.

Method 100 includes processing the value map using a first neural network to determine a probability heat map at 106. The probability heat map includes groups of graded values. The graded values are indicative of the probability that the respective pixel group includes a representation of an object of interest.

Method 100 further includes detecting which groups of graded values meet a determined probability threshold at 108. According to various embodiments, the determined probability threshold may be calculated and further determined in numerous ways. According to some embodiments, the determined probability threshold may be predetermined by a user. According to further embodiments, the determined probability threshold may be dynamically determined programmatically. Dynamically determining the determined threshold may include various subroutine functions, predetermined rules, or statistical algorithms. For example, dynamic determination may include using curve fit statistical analysis, such as interpolation, smoothing, regression analysis, extrapolation, among many others, to determine the determined probability threshold for that particular image or data set.

According to some embodiments, graded values may include various ranges, including zero (0) to one (1) or zero to one-hundred (100). The graded values may be indicative of the probability that the respective pixel group includes a representation of an object of interest. Groups of graded values that meet the predetermined probability threshold are identified as zones of interest, according to some embodiments. For example, if the predetermined probability threshold is set at 0.5, the groups of graded values greater than or equal to 0.5 (e.g., 0.5-1.0) will be identified as zones of interest.

Method 100 further includes cropping and/or rescaling the original image based on the zones of interest detected from the probability heat map at 110. Cropping and rescaling the original image may include combining the representations of zones of interest into one representative dataset. According to some embodiments, representations of zones of interest may include sections of the received image data in which zones of interest have been identified. The cropping procedure of 110 eliminates sections of the image data that have not been identified as zones of interest, according to some embodiments. According to some embodiments, the scaling procedure of 110 fetches data from the originally received image data, the fetched data being a representative of the zones of interest. The cropping and scaling procedures of 110 may include pre-processing procedures to prepare the data identified by the zones of interest to be used as input to a second neural network, according to some embodiments.

Further still, method 100 includes processing zones of interest to detect objects of interest therein using a second neural network at 112, according to some embodiments. Objects of interest may be defined dynamically by a continuous machine learning process and identified by the application of such machine learning data, according to some embodiments. Other embodiments may define objects of interest using predetermined characteristics and/or classifications that are assigned by an outside entity. The second neural network receives as input image data within the zones of interest. According to some embodiments, the image data may include downscaled representations of the originally received image data or the originally received image data itself or a mosaic combining downscaled representations of the regions of interest of the originally received image. The second neural network generates as output a representation of the objects of interest, according to some embodiments. A representation of the objects of interest may include one or more of the following: a classification for each object of interest and coordinates indicative of the location of each object of interest within the originally received image data.

According to some embodiments, method 100 may repeat continuously until the procedure is terminated. For example, method 100 may repeat for every new image dataset that is made available to the system. Method 100 provides many benefits over other standard Region Proposal Networks (RPN) as understood by one skilled in the art. The present disclosure provides for the use of leaner neural networks. According to some embodiments, the neural networks may include as few as three (3) and as many as seven (7) layers depending on the input dataset. In a prototypical embodiment, the implementation of the neural networks as described herein does not require bounding box hyperparameter settings as many presently in the art. Rather than implementing bounding box hyperparameter settings, one or more of the neural networks use pixel values to determine the location of zones of interest and/or objects of interest, according to some embodiments. The pixel values may be used to represent the probability that the associated pixel comprises at least a portion of an object of interest. The efficiencies provided by the present disclosure provide many benefits over current state of the art.

Figure 2:
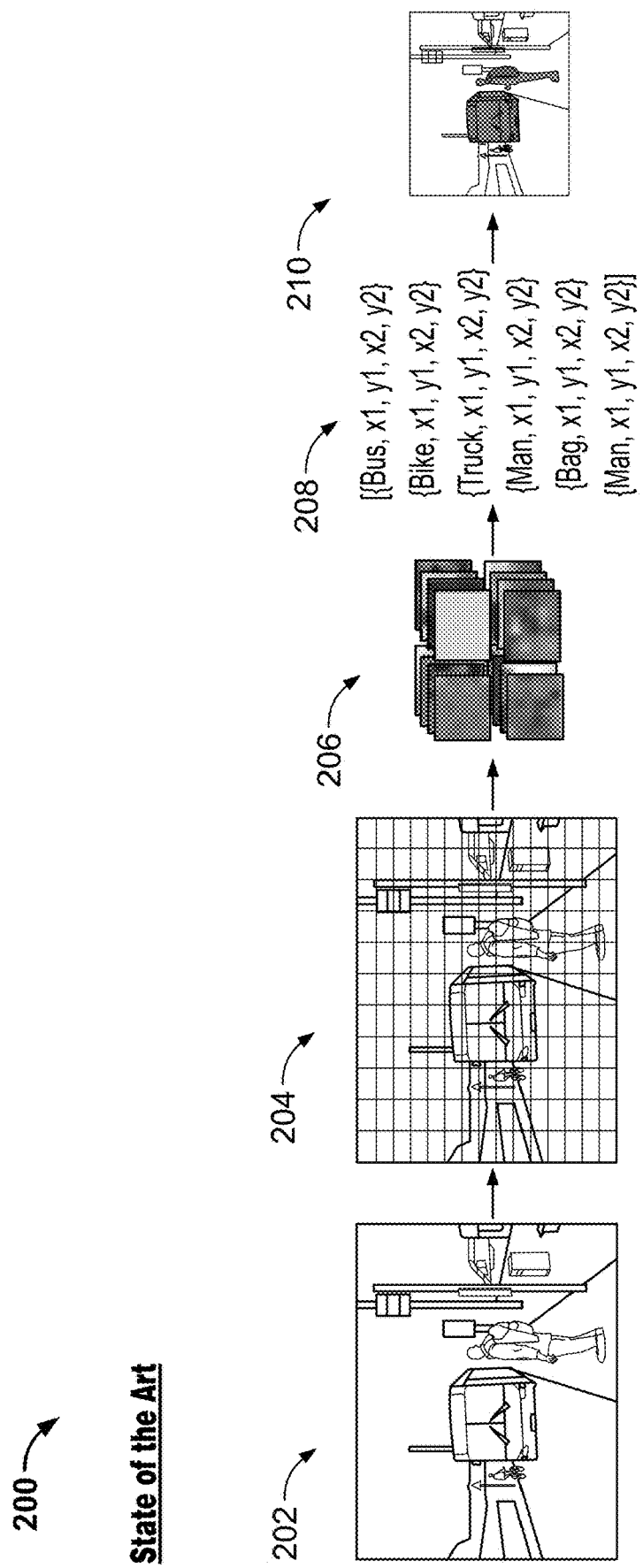
FIG. 2 depicts a workflow diagram of the present state of the art, according to one embodiment.

FIG. 2 illustrates a workflow image diagram of the current state of the art 200. The current state of the art receives an image at 202. After receiving an image, the pixels gathered into various chunks of pixels at 204. These chunks are then fed into an Object Detection Neural Network and processed in a "brute force" manner at 206. The Object Detection Neural Network produces, by way of brute force, output data at 208. The output data may or may not be recombined with the original image data to create a human observable output at 210. It is well known in the current state of the art that computational complexities of such analyses are equal to the sum of the computational complexities of grayscale conversion, Gaussian Binomial LPF, and Bicubic Interpolation.

Figure 3:
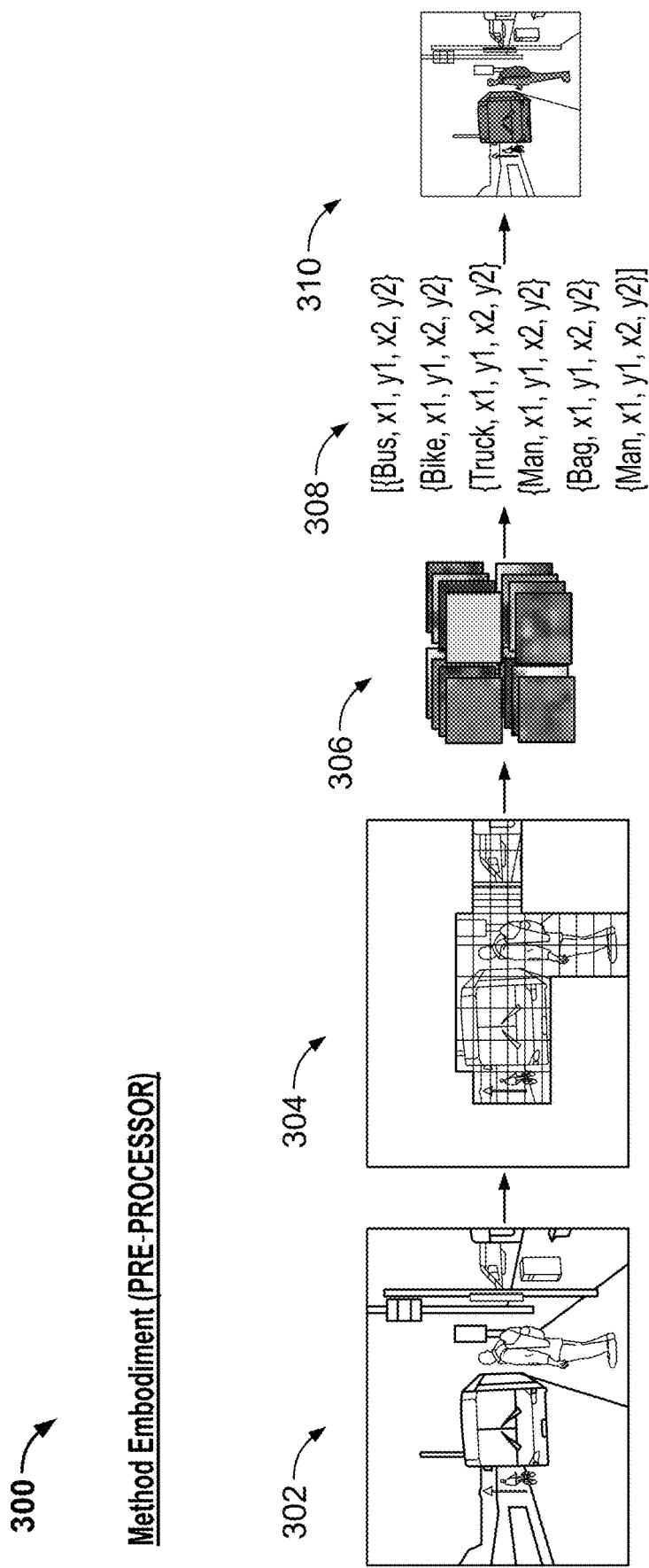
FIG. 3 depicts a workflow diagram of an exemplary method for detecting zones of interest and objects located therein, according to an exemplary embodiment.

FIG. 3 illustrates a workflow diagram of an exemplary method 300 for detecting zones of interest and objects located therein, according to an exemplary embodiment. Method 300 may be easily inserted into pre-existing workflows, according to some embodiments. Method 300 provides that the system receives image data at 302, the image data including pixels. The pixels of the received image data may be downsampled to generate a value map at 304. The value map is then analyzed by at 306 by a neural network to generate output data at 308. The output data may or may not be recombined with the original image data (e.g., 302) to generate a representation of objects of interest as shown at 310. Method 300 as provided by FIG. 3 may be used to identify images with no objects of interest to discard images that do not include objects of interest. By eliminating images that do not include objects of interest, method 300 reduces the computational load of analyzing every single image, whether or not it includes an object of interest. By reducing the computational load, method 300 also reduces the size of data transmitted between systems, significantly reducing the bandwidth required to perform data analysis. Further still, method 300 improves network efficiency across a wide variety of networks, according to some embodiments.

Figure 4:
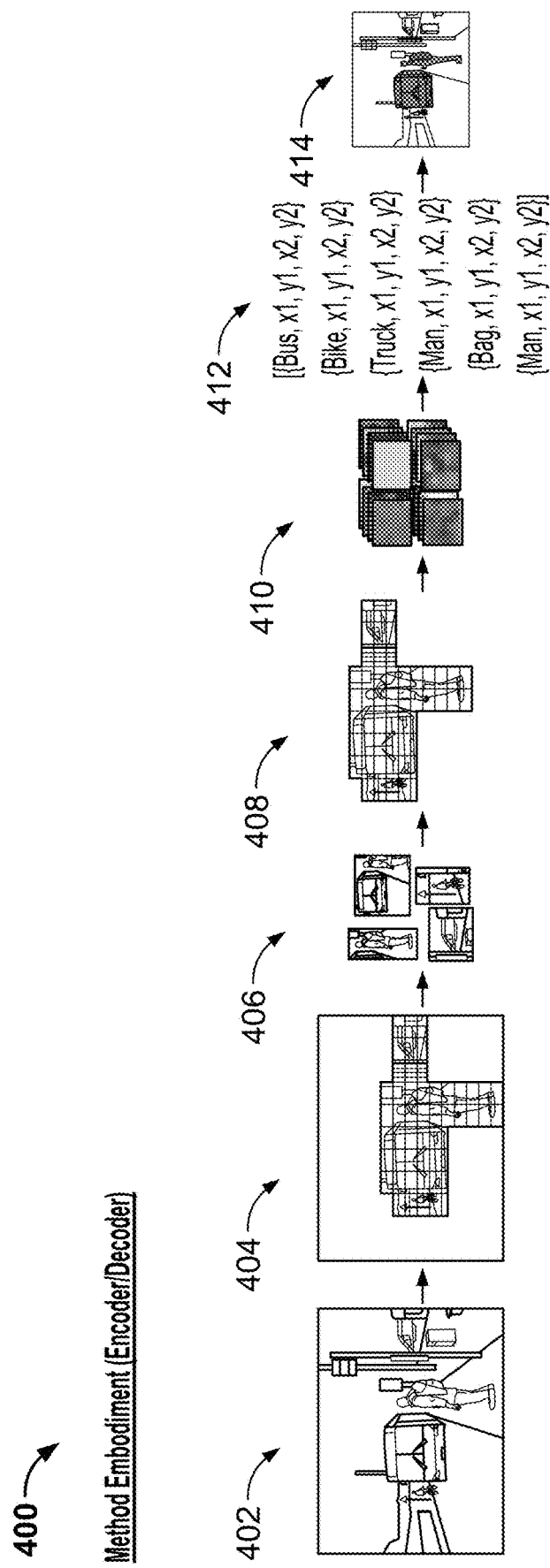
FIG. 4 depicts a workflow diagram of an exemplary method for detecting zones of interest and objects located therein, according to an exemplary embodiment.

FIG. 4 illustrates a workflow diagram of an exemplary method 400 for detecting zones of interest and objects located therein, according to an exemplary embodiment. Method 400 provides that the system receives image data at 402, the image data including pixels. The pixels of the received image data may be downsampled to generate a value map at 404. The value map is then analyzed by a first neural network to generate a probability heat map, which is then filtered by a probability threshold to determine zones of interest at 406. At 408, the zones of interest may be combined with the received image data (e.g., 402) to create an image file that includes zones of interest and excludes zones that do not meet the predetermined probability threshold. According to some embodiments, the image file may include full-resolution images, scaled images, or a combination of both. The image file may be analyzed by a second neural network at 410, which generates output data at 412. The output data may or may not be recombined with the received image data at full-resolution (e.g., 402) or after it is downsampled to generate a representation of objects of interest as shown at 414.

Similar to method 300, method 400 as provided by FIG. 4 may be used to identify images with no objects of interest to discard images that do not include objects of interest. According to some embodiments, method 400 transmits zones of interest at full-resolution, while the rest of the combined output image is downsampled. In addition to transmitting zones of interest at full-resolution, method 400 also transmits coordinates and time stamps associated with zones of interest to reassemble the processed image after transmission.

Figure 5:
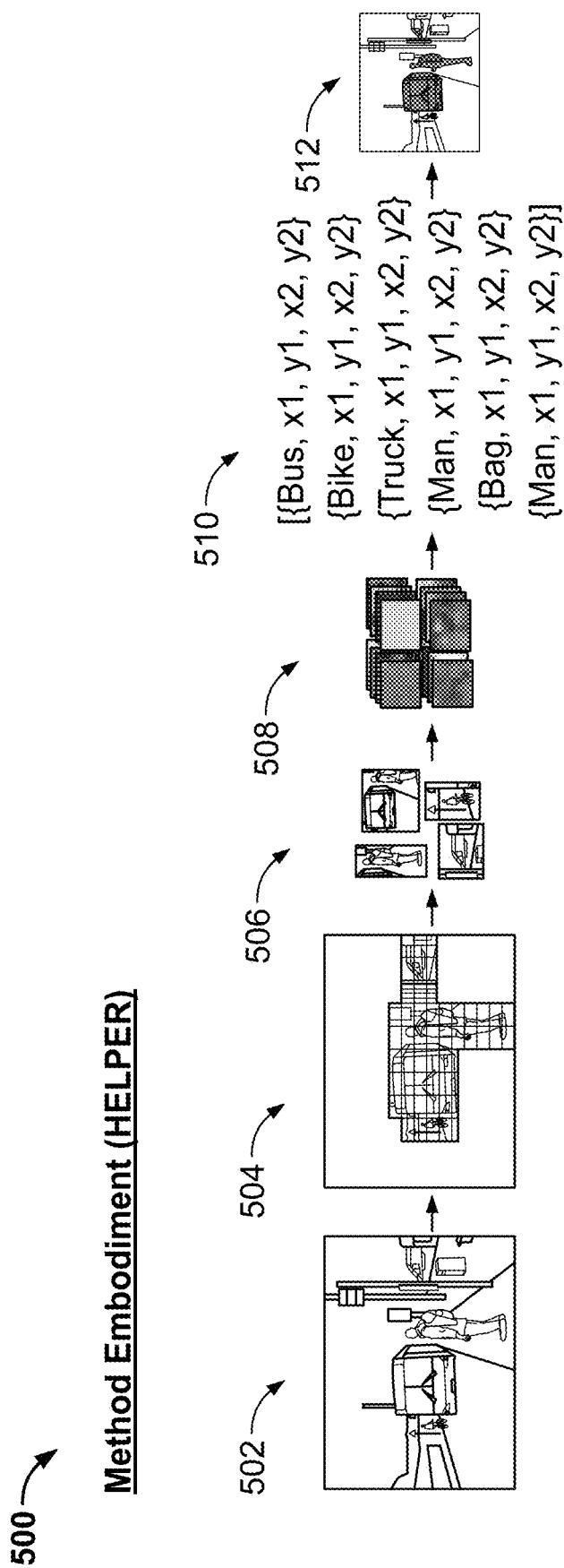
FIG. 5 depicts a workflow diagram of an exemplary method for detecting zones of interest and objects located therein, according to an exemplary embodiment.

FIG. 5 illustrates a workflow diagram of an exemplary method 500 for detecting zones of interest and objects located therein, according to an exemplary embodiment. Method 500 provides that the system receives image data at 502, the image data including pixels. The pixels of the received image data may be downsampled to generate a value map at 504. The value map is analyzed by a first neural network to generate a probability heat map, which is filtered by a probability threshold to determine zones of interest at 506. At 508, the zones of interest may be analyzed by a second neural network to generate output data at 510. The output data may or may not be recombined with the received image data at full-resolution (e.g., 502) or after it is downsampled to generate a representation of objects of interest as shown at 512.

According to some embodiments, method 500 may provide benefits similar to methods 300 and 400 (e.g., discarding images with no objects of interest, only transmitting zones of interest at full-resolution, etc.). Method 500 further provides for a neural network architecture that only analyzes individual zones of interest. As such, rather than executing the sum of the computational complexities of grayscale conversion, Gaussian Binomial LPF, and Bicubic Interpolation for a simple sampling technique, method 500 executes its downsampling techniques in a single operation. According to some embodiments, methods 300 and 400 may also execute their respective downsampling techniques in a single operation.

Figure 6:
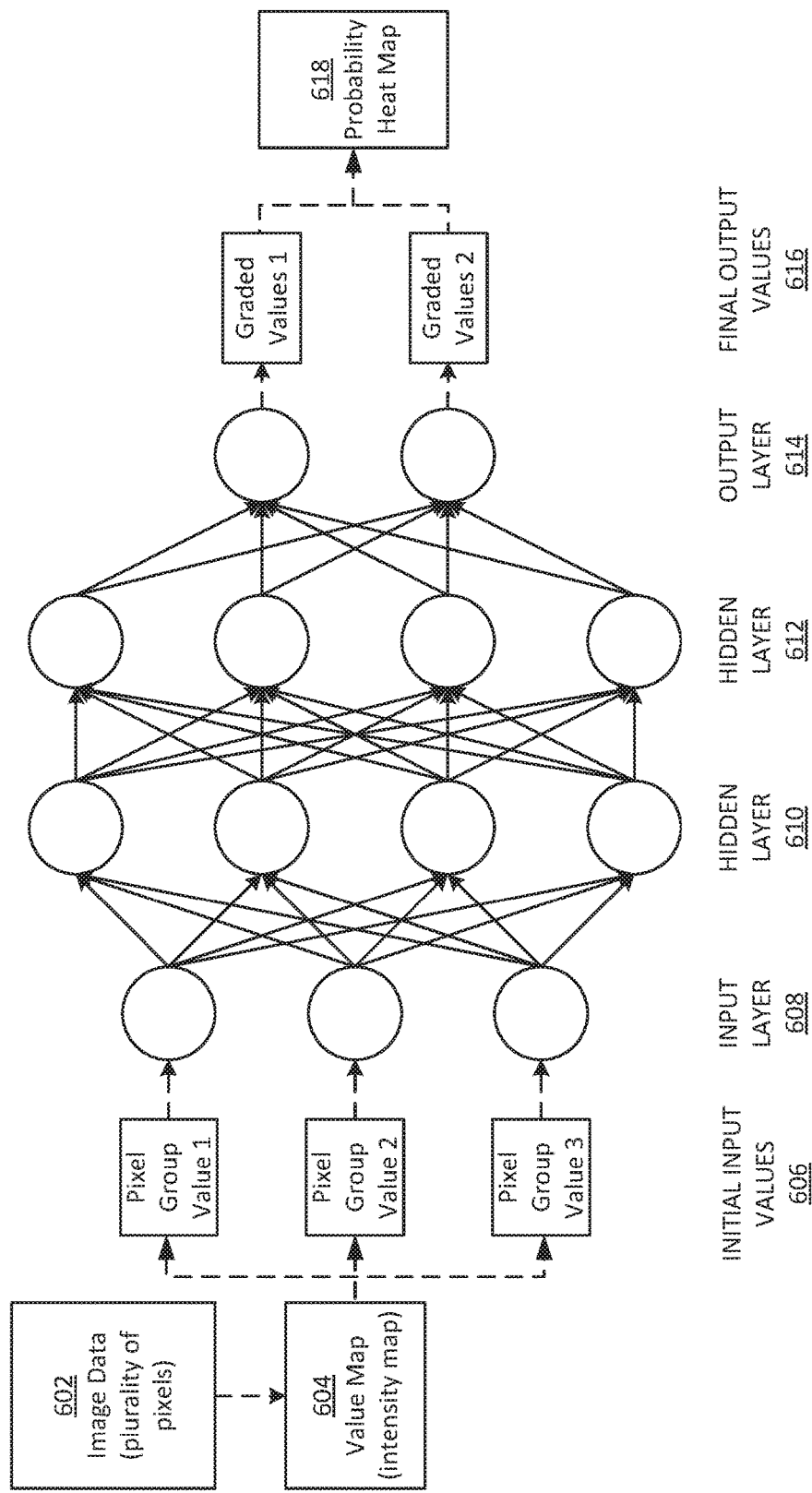
FIG. 6 depicts an expanded view of a first neural network architecture, according to an exemplary embodiment.

FIG. 6 illustrates an exemplary embodiment of a first neural network 600. Before first neural network 600 receives input data, image data 602 is downsampled into a value map 604 as shown in FIG. 6. According to some embodiments, value map 604 includes a plurality of pixel group values. For example, Pixel Group Value 1, Pixel Group Value 2, and Pixel Group Value 3 are received by the first neural network 600 at the initial input values 606. According to some embodiments, first neural network 600 includes three to seven network layers of artificial neurons. For example, first neural network 600 includes four layers: input layer 608, hidden layers 610 and 612, and output layer 614 as shown in FIG. 6. First neural network 600 generates final output values 616. According to some embodiments, final output values 616 may include groups of graded values, such as graded values 1 and graded values 2 as shown in FIG. 6. Final output values 616 may be processed, combined, or otherwise altered to generate a probability heat map 618, according to some embodiments.

Figure 7:
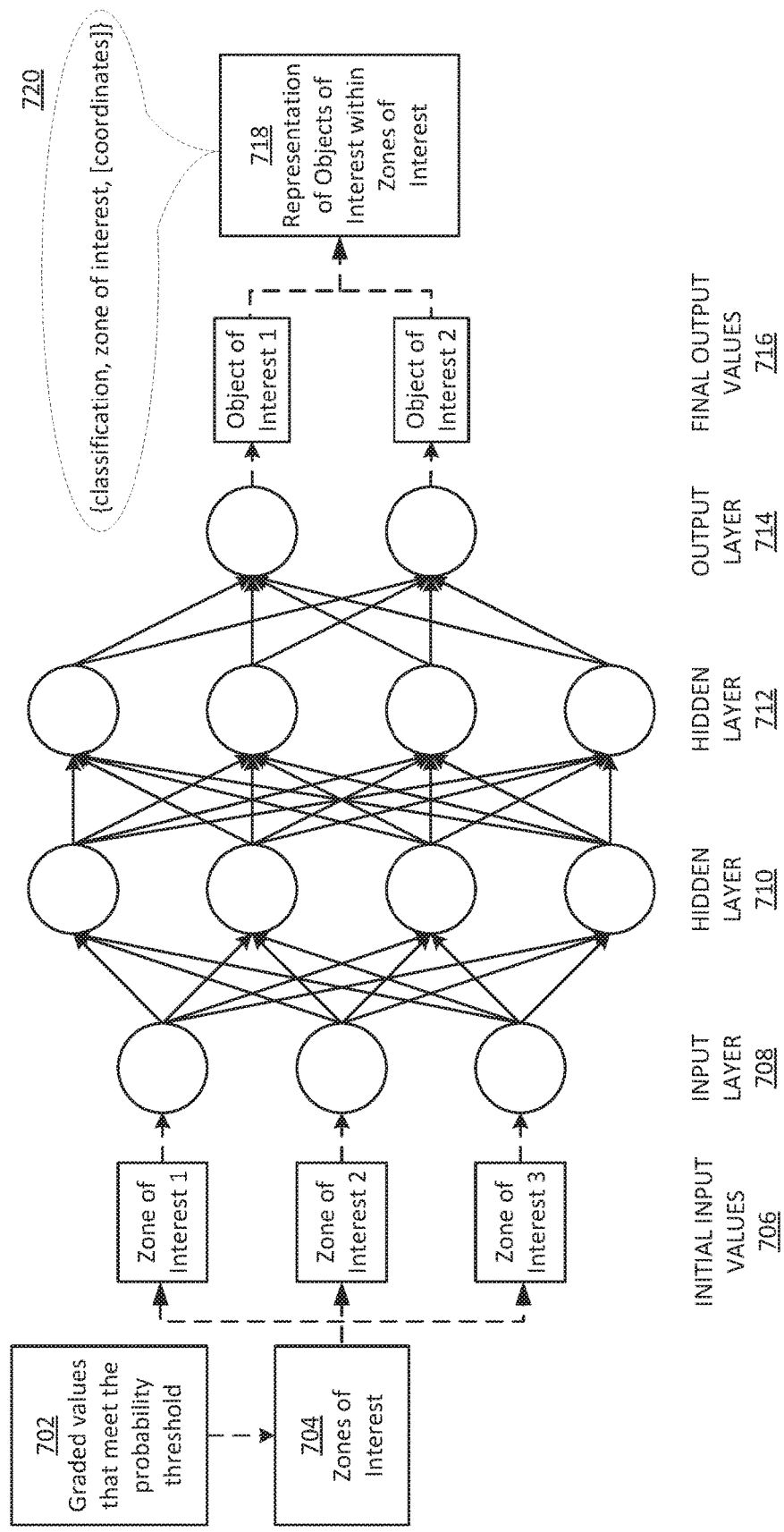
FIG. 7 depicts an expanded view of a second neural network architecture, according to an exemplary embodiment.

FIG. 7 illustrates an exemplary embodiment of a second neural network 700. Before the second neural network 700 receives input data, graded values 702 may be obtained from a probability heat map. According to some embodiments, graded values 702 may be processed, filtered, or otherwise altered to generate one or more zones of interest 704 as shown in FIG. 7. According to some embodiments, each of the zones of interest 704 may be separately provided as initial input values 706. For example, Zone of Interest 1, Zone of Interest 2, and Zone of Interest 3 are received by the second neural network 700 at the initial input values 706. According to some embodiments, second neural network 700 includes three to seven network layers of artificial neurons. For example, second neural network 700 includes four layers: input layer 708, hidden layers 710 and 712, and output layer 714 as shown in FIG. 7. Second neural network 700 generates final output values 716. According to some embodiments, final output values 716 may include objects of interest, such as object of interest 1 and object of interest 2 as shown in FIG. 7. Final output values 716 may be processed, combined, or otherwise altered to generate a representation of objects of interest 718, according to some embodiments.

Using the above described methods, embodiments of the invention can be deployed in a variety of architectural arrangements. In one particular embodiment, the image collection and object detection employs domain-specific models that are derived and enhanced on a centralized hosted service and subsequently distributed to edge devices for execution thereon. For example, "smart" cameras and other internet-of-things devices can be pre-populated with one or more models, either during manufacture or upon initialization. These devices may be periodically connected to a cloud-based platform (via API, web service, or other means) that provides functions such as initial data collection, data science, model training, model evaluation and testing, over-the-air model deployment and updates to edge devices, and monitoring of device health. However, the devices need not remain connected to the cloud service to operate, as the models and processing instructions can be executed on the devices themselves. In some instances, specific detection events can trigger more advanced functions to come online only when needed, thus saving power and extending battery life for always-on applications. This approach "selectively" focuses its attention on particular areas of interest (e.g., pixel groups identified using the first network process) and only then engaging higher functions and subsequent networks to specifically identify an object, allowing for lower power draws (e.g., less than 100 microjoules per inference) on power-constrained edge devices.

As devices reconnect to the cloud service, additional images can be added to the library of training data and used to further improve the various models, which in turn can be redeployed across all devices, or in some instances only those devices using a particular model or operating in a particular domain.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array), an ASIC (application specific integrated circuit), non von neumann architectures, neuromorphic chips, and deep learning chips.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto optical disks, optical disks, or solid state drives. However, a computer need not have such devices. Moreover, a computer can be embedded in another device, e.g., a smart phone, a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including, by way of example, semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method for determining a zone of interest within an image, the method comprising:
  receiving, by a computer processor, image data wherein the image data comprises a plurality of pixel groups, wherein each pixel group comprises an average distance therebetween such that the number of pixels within a smallest zone of interest falls between a minimum sample and a maximum sample within the potential zone of interest;
  processing, by the computer processor, the plurality of pixel groups to determine a pixel value for pixels of at least one or more of the plurality of pixel groups, wherein the pixel value is determined from a comparison of plurality of pixel values for each pixel;
  determining, by the computer processor, a pixel group value for each of the at least one or more of the plurality of pixel groups wherein the pixel group value is based on the pixel values of the pixels associated with the respective pixel group;
  determining, by the computer processor, a probability heat map from the plurality of maximum pixel group values by way of a first neural network,
    wherein the first neural network receives as input at least one pixel group value and produces as output the probability heat map comprising groups of graded values,
    wherein the graded values are indicative of the probability that the respective pixel group includes a representation of an object of interest;

determining, by the computer processor, at least one zone of interest based on whether the groups of graded values meet a determined probability threshold; and determining, by the computer processor, objects of interest within the at least one zone of interest by way of a second neural network, wherein the second neural network receives as input the at least one zone of interest and produces as output a representation of the objects of interest, wherein the representation of the objects of interest comprises at least a classification of each object of interest and the location thereof within the received image data.

2. The method of claim 1, wherein the second neural network is the same as the first neural network.

3. The method of claim 1, wherein the pixel group value comprises a summary pixel value associated with the respective pixel group.

4. The method of claim 3, wherein the summary pixel values comprise one of an average, minimum, maximum, and harmonic mean of each pixel value.

5. The method of claim 1, wherein the processing does not perform mathematical transformations on the plurality of pixel values for each pixel of a pixel group.

6. The method of claim 1, wherein the minimum sample within the zone of interest is at least four pixels in width and four pixels in height.

7. The method of claim 1, wherein the maximum sample within the zone of interest is no more than 18 pixels in width or height.

8. The method of claim 1, wherein the determined probability threshold is predetermined or dynamically determined at runtime.

9. The method of claim 1, wherein the first and second neural networks are fully convolutional networks (FCNs).

10. The method of claim 9, wherein the first neural network is a fully convolutional multi-layer network (FCN) comprising a minimum of three layers and a maximum of seven layers.

11. The method of claim 10, wherein none of the multiple layers of the first neural network are fully connected.

12. A system for identifying a zone of interest within an image, comprising:

a non-transitory computer-readable medium for storing received image data; and a processor configured to perform operations comprising:

receiving image data wherein the image data comprises a plurality of pixel groups, wherein each pixel group comprises an average distance therebetween such that the number of pixels within a smallest zone of interest falls between a minimum sample and a maximum sample within the potential zone of interest;

processing the plurality of pixel groups to determine a pixel value for a subset of pixels of at least one or more of the plurality of pixel groups, wherein the pixel value is determined from a comparison of plurality of pixel values for each pixel;

determining a pixel group value for each of the at least one or more of the plurality of pixel groups, wherein the pixel group value is based on the pixel values of the pixels associated with the respective pixel group;

determining a probability heat map from the plurality of maximum pixel group values by way of a first neural network, wherein the first neural network receives as input at least one pixel group value and produces as output the probability heat map comprising groups of graded values, wherein the graded values are indicative of the probability that the respective pixel group includes a representation of an object of interest;

determining at least one zone of interest based on whether the groups of graded values meet a determined probability threshold; and determining objects of interest within the at least one zone of interest by way of a second neural network, wherein the second neural network receives as input the at least one zone of interest and produces as output a representation of the objects of interest, wherein the representation of the objects of interest comprises at least a classification of each object of interest and the location thereof within the received image data.

13. The system of claim 12, wherein the second neural network is the same network as the first neural network.

14. The system of claim 12, wherein the pixel group value comprises a summary pixel value of the pixels associated with the respective pixel group.

15. The system of claim 14, wherein the summary pixel values comprise one of an average, minimum, maximum, and harmonic mean of each pixel value.

16. The system of claim 12, wherein the processing does not perform mathematical transformations on the plurality of pixel values for each pixel of a pixel group.

17. The system of claim 12, wherein the minimum sample within the zone of interest is at least four pixels.

18. The system of claim 12, wherein the maximum sample within the zone of interest is no more than 18 pixels.

19. The system of claim 12, wherein the determined probability threshold is predetermined or dynamically determined at runtime.

20. The system of claim 12, wherein the first and second neural networks are fully convolutional networks (FCNs).

21. The system of claim 20, wherein the first neural network is a fully convolutional multi-layer network (FCN) comprising a minimum of three layers and a maximum of seven layers.

22. The system of claim 21, wherein none of the multiple layers of the first neural network are fully connected.

23. A non-transitory computer-readable medium comprising instructions stored thereon, wherein the instructions are executable by a microprocessor to perform a method for identifying a zone of interest within an image, comprising:

receiving image data wherein the image data comprises a plurality of pixel groups, wherein each pixel group comprises an average distance therebetween such that the number of pixels within a smallest zone of interest falls between a minimum sample and a maximum sample within the potential zone of interest;

processing the plurality of pixel groups to determine a pixel value for a subset of the pixels within at least one or more of the plurality of pixel groups, wherein the pixel value is determined from a comparison of plurality of pixel values for each pixel;

determining a pixel group value for each of the at least one or more of the plurality of pixel groups, wherein the pixel group value is based on the pixel values of the pixels associated with the respective pixel group;

determining a probability heat map from the plurality of maximum pixel group values by way of a first neural network, wherein the first neural network receives as input at least one pixel group value and produces as output the probability heat map comprising groups of graded values, wherein the graded values are indicative of the probability that the respective pixel group includes a representation of an object of interest;

determining at least one zone of interest based on whether the groups of graded values meet a determined probability threshold; and determining objects of interest within the at least one zone of interest by way of a second neural network, wherein the second neural network receives as input the at least one zone of interest and produces as output a representation of the objects of interest, wherein the representation of the objects of interest comprises at least a classification of each object of interest and the location thereof within the received image data.

24. The non-transitory computer-readable medium of claim 23, wherein the second neural network is the same network as the first neural network.

25. The non-transitory computer-readable medium of claim 24, wherein the pixel group value comprises a summary pixel value of the pixels associated with the respective pixel group.

26. The non-transitory computer-readable medium of claim 23, wherein the summary pixel group value comprise one of an average, minimum, maximum, and harmonic mean of each pixel value.

27. The non-transitory computer-readable medium of claim 23, wherein the processing does not perform mathematical transformations on the plurality of pixel values for each pixel of a pixel group.

28. The non-transitory computer-readable medium of claim 23, wherein the minimum sample within the zone of interest is at least four pixels.

29. The non-transitory computer-readable medium of claim 23, wherein the maximum sample within the zone of interest is no more than 18 pixels.

30. The non-transitory computer-readable medium of claim 23, the determined probability threshold is predetermined or dynamically determined at runtime.

31. The non-transitory computer-readable medium of claim 23, wherein the first and second neural networks are fully convolutional networks (FCNs).

32. The non-transitory computer-readable medium of claim 31, wherein the first neural network is a fully convolutional networks (FCNs) comprising a minimum of three layers and a maximum of seven layers.

33. The non-transitory computer-readable medium of claim 32, wherein none of the multiple layers of the first neural network are fully connected.

* * * * *